Sept. 1, 1953  H. D. TAYLOR  2,650,781
BOUNDARY LAYER CONTROL FOR AIRCRAFT
Filed Aug. 11, 1950
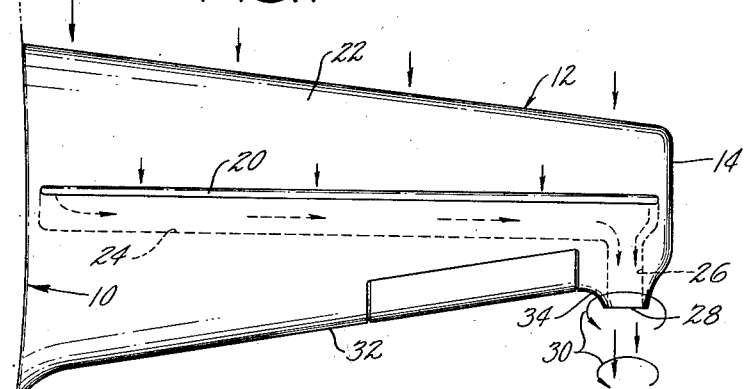
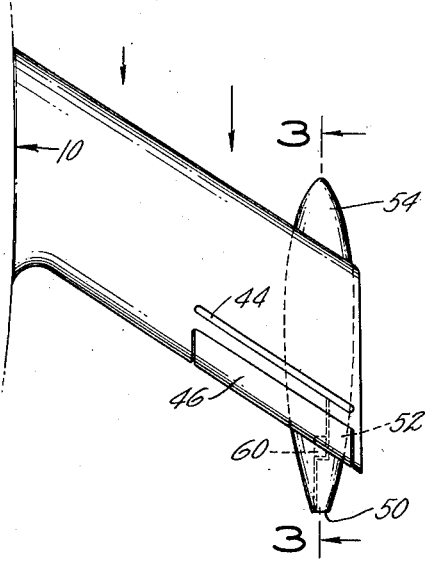
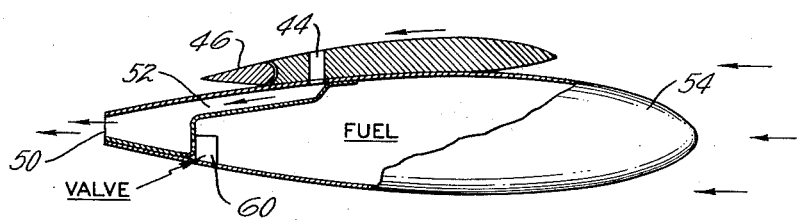
INVENTOR
HARLAN D. TAYLOR
BY Leonard F. Wehllind
AGENT Patented Sept. 1, 1953

2,650,781

UNITED STATES PATENT OFFICE 2,650,781

BOUNDARY LAYER CONTROL FOR AIRCRAFT

Harlan D. Taylor, Manchester, Conn., assignor to United Aircraft Corporation, East Hartford, Conn., a corporation of Delaware Application August 11, 1950, Serial No. 178,886

2 Claims. (Cl. 244—40)

This invention relates to improvements in aircraft and more particularly to boundary layer control means for improving the efficiency of aircraft lift surfaces and the like.

It is an object of this invention to provide simple yet highly efficient means for energizing the boundary layer flow over aircraft surfaces.

Another object of this invention is to provide boundary layer control comprising mechanism for drawing off boundary layer air by suction which is obtained by utilizing the low pressure region within the core of the wing tip vortex which is produced during flight.

It is a further object of this invention to provide improved pumping mechanism wherein the pumping energy is obtained by utilizing the low pressure core region of the wing tip vortex. The pumping energy so obtained increases with angle of attack so that it increases proportionately with the need up to the stalling angle of the wing.

Another object of this invention is to provide a boundary layer control system of the type wherein the increasing capacity relative to angle of attack greatly increases the stalling angle of the aircraft wing and/or greatly increases the effectiveness of aircraft wing control surfaces.

A still further object of this invention is to provide a boundary layer pumping mechanism without movable parts for an aircraft which operates continuously during flight regardless of whether the aircraft power plant or any power plant which might be used to produce suction is in operation or has failed.

These and other objects of this invention will become readily apparent from the following detail description of the accompanying drawing in which:

Fig. 1 is a partial view of an aircraft having wing boundary layer control according to this invention.

Fig. 2 is a view similar to Fig. 1 showing a modified form of this invention adapted for use with an external wing tip fuel tank.

Fig. 3 is an enlarged partial cross-sectional view taken along plane 3—3 of Fig. 2.

Although various types of boundary layer energizing means have been utilized in the past, both the suction and blower principles of energization have entailed the use of pumping mechanisms which derive power from the main aircraft power plant or a separate auxiliary source. Failure of the power source results in a discontinuance of the boundary layer energization, which energization, for example, is often of primary importance when the aircraft is being brought to a landing without engine power.

Referring to Fig. 1, an aircraft fuselage 10 is shown having a wing 12 extending laterally therefrom and terminating in a tip 14. It is well-known that due to the difference in pressures adjacent the upper and lower surfaces of a wing, an air flow is produced around the tip extremity from the high pressure lower surface of the wing to the relatively low pressure upper surface of the wing whereby a trailing tip vortex moves downstream from the wing tip.

It is further well-known that a rotating mass of fluid similar to the trailing vortex mentioned above will have a low pressure area within the core thereof, that is, adjacent its axis of rotation.

To this end then this low pressure energy is utilized to provide suction power during flight to draw off boundary layer air from an external surface of the aircraft and may be used also as a source of vacuum for any other purpose during flight. As illustrated in Fig. 1, an elongated spanwise opening or slot 20 is provided in the upper wing surface 22. A duct 24 carried internally of the wing 12 communicates with the slot 20 and also communicates with a duct 26 which terminates in an opening 28 adjacent the trailing edge of the wing within the core of the wing tip vortex whose motion is indicated by the arrows 30. The opening 28 may terminate in spaced aft relation to the wing trailing edge 32 and may be surrounded by fairing 34.

As shown in Figs. 2 and 3, it may be desirable to draw off only a localized portion of the boundary layer by means of a slot 44 upstream of and adjacent an aileron 46 to improve aileron effectiveness. With an external wing tip fuel tank installation, the trailing edge 50 of the tank has an opening which communicates with the slot 44 by means of a passage 52. In this instance the tank 54 may be located such that maximum pumping effectiveness from the wing tip vortex core is obtained at the desired wing angle of attack range, i. e., where increased control effectiveness is desired. Thus, the wing tip vortex core will draw off boundary layer air which is exhausted into the airstream.

Along with the boundary layer control advantages the positioning of the trailing edge 50 in the core of the wing tip vortex would further provide low pressure to aid in dumping fuel in an emergency without necessarily jettisoning the tank. Thus by opening a valve 60 or similar means the drainage in flight would be speeded up.

The use of a boundary layer control mechanism of this type increases the maximum lift coefficient of the wing and also reduces the profile drag at high angles of attack. Also, it has been found that the suction power produced by the trailing vortex increases with the angle of attack of the wing up to the angle of stall so that the amount of boundary layer withdrawal also increases with angle of attack. It will be noted that this feature is of primary importance when the aircraft is brought in for a landing since it is at this time that the wing is at high angles of attack and high lift is desirable. For a given airfoil configuration separation over the wing will be delayed so that the stalling angle is increased and the landing speed of the aircraft is decreased.

It might be added that the vortex pumping strength also increases with a decrease in aspect ratio of the wing and therefore a higher quantity flow coefficient is obtained with wings of lower aspect ratios. The quantity flow coefficient can be defined as the volume of airflow per unit time divided by the product of the wing area and the free stream velocity. Hence this invention provides further improved advantages for low aspect ratio aircraft.

It is then apparent that as a result of this invention a simple yet efficient pumping mechanism has been provided for boundary layer energization and the like which is extremely simple, efficient and dependent only on the motion of the free airstream over the aircraft wing.

Although only certain embodiments of this invention have been illustrated and described herein, it will be apparent that various changes and modifications may be made without departing from the scope of this novel concept.

What it is desired to obtain by Letters Patent is:

1. In an aircraft having a fuselage and a wing, said wing forming external upper and lower major surfaces and terminating in a free tip which produces a tip vortex during flight, suction means in said wing for taking off boundary layer air from an external surface of the wing comprising an unobstructed, imperforate, fluidtight duct in said wing communicating at one end with an opening in said external surface and terminating at the other end in a rearwardly facing opening at the trailing edge of said wing tip, whereby suction in said duct is produced by the low pressure developed at the core of said tip vortex during movement of the wing in flight.

2. In an aircraft having an external surface, said aircraft including a fuselage and a wing, said wing forming upper and lower major surfaces and terminating in a free tip which produces a tip vortex during flight, suction means in said wing for taking off boundary layer from said external surface comprising an unobstructed, imperforate fluidtight duct in said wing communicating at one end with an opening in said external surface and terminating at the other end in a rearwardly facing opening adjacent the trailing edge of said wing tip, whereby suction in said duct is produced by the low pressure developed at the core of said tip vortex during movement of the wing in flight.

HARLAN D. TAYLOR.

References Cited in the file of this patent

UNITED STATES PATENTS

| Number | Name | Date |
|---|---|---|
| 2,142,699 | Riddle | Jan. 3, 1939 |
| 2,394,513 | Chappedelaine | Feb. 5, 1946 |
| 2,438,942 | Polk | Apr. 6, 1948 |
| 2,447,100 | Stalker | Aug. 17, 1948 |
| 2,464,651 | Pecker | Mar. 15, 1949 |
| 2,470,128 | Barrick et al. | May 17, 1949 |

FOREIGN PATENTS

| Number | Country | Date |
|---|---|---|
| 606,088 | Great Britain | Aug. 5, 1948 |
| 767,064 | France | Apr. 23, 1934 |
| 807,110 | France | Oct. 12, 1936 |